United States Patent [19]

Grinstead

[11] Patent Number: 4,741,831
[45] Date of Patent: May 3, 1988

[54] PROCESS AND COMPOSITION FOR REMOVAL OF METAL IONS FROM AQUEOUS SOLUTIONS

[75] Inventor: Robert R. Grinstead, Walnut Creek, Calif.

[73] Assignee: The Dow Chemical Company, Midland, Mich.

[21] Appl. No.: 937,950

[22] Filed: Dec. 4, 1986

[51] Int. Cl.[4] ............................................. B01D 13/00
[52] U.S. Cl. ................................... 210/638; 210/641; 210/651; 210/912; 210/913; 210/914
[58] Field of Search .............. 210/634, 638, 639, 651, 210/902, 912, 913, 914, 641

[56] References Cited

U.S. PATENT DOCUMENTS

| | | | |
|---|---|---|---|
| 3,331,773 | 7/1967 | Gunderson et al. | 210/701 |
| 3,790,610 | 2/1974 | Lum | 210/912 |
| 3,953,545 | 4/1976 | Stoy | 260/898 |
| 3,957,504 | 5/1976 | Ho et al. | 210/638 |
| 3,969,239 | 7/1976 | Shinohara et al. | 210/735 |
| 4,031,038 | 6/1977 | Grinstead et al. | 423/24 |
| 4,089,778 | 5/1978 | Gauger | 210/638 |
| 4,254,087 | 3/1981 | Grinstead | 423/24 |
| 4,356,309 | 10/1982 | Lalk | 546/278 |

FOREIGN PATENT DOCUMENTS

| | | | |
|---|---|---|---|
| 2458066 | 6/1975 | Fed. Rep. of Germany | 210/638 |
| 49-90691 | 8/1974 | Japan | 210/912 |
| 60118288 | 11/1983 | Japan . | |

OTHER PUBLICATIONS

K. S. Choi et al., *Pollimo*, vol. 5, #4, pp. 266–277, (1981).
*Chemical Abstracts*, vol. 96(2), 7417 g, 1981.
E. Leonard in "Dialysis" in *Kirk-Othmer: Encyclopedia of Chemical Technology*, (3rd Ed.), vol. 7, pp. 564–579, (1979), John Wiley & Sons, New York.
P. R. Klinkowski in "Ultrification," in *Kirk-Othmer: Encyclopedia of Chemical Technology*, (3rd Ed.), vol. 23, 439–461, (1983), John Wiley & Sons, New York.

*Primary Examiner*—Peter A. Hruskoci

[57] ABSTRACT

The present invention relates to a cyclic continuous process and composition for the removal of metal ions, particularly transition metal ions, from aqueous solutions a fluid stream containing the metal ions is contacted with an aqueous solution of a water soluble organic polymeric chelant. The metal is chelated by the chelant: The separation of water and low molecular weight products (molecular weight less than 500) is accomplished usually by dialysis or ultrafiltration. The metal ion is then released using dilute mineral acid and collected. The water-soluble chelant is then recycled. The metal ions chelated removed included iron, cobalt, copper, vanadium, cadmium, nickel, zinc, lead, and aluminum. A preferred chelant is one having a pendant pyridine group in conjunction with alkyl amine groups, e.g., $-N(R)-CH_2-C_5H_4N$, where R is alkyl.

18 Claims, 5 Drawing Sheets

ABSORPTION OF METAL IONS WITH
UF / POLYCHELANT SYSTEM

30 PSIG,
FLOW RATE 20 GSFD

REMOVAL OF METAL IONS WITH UF / POLYCHELANT SYSTEM

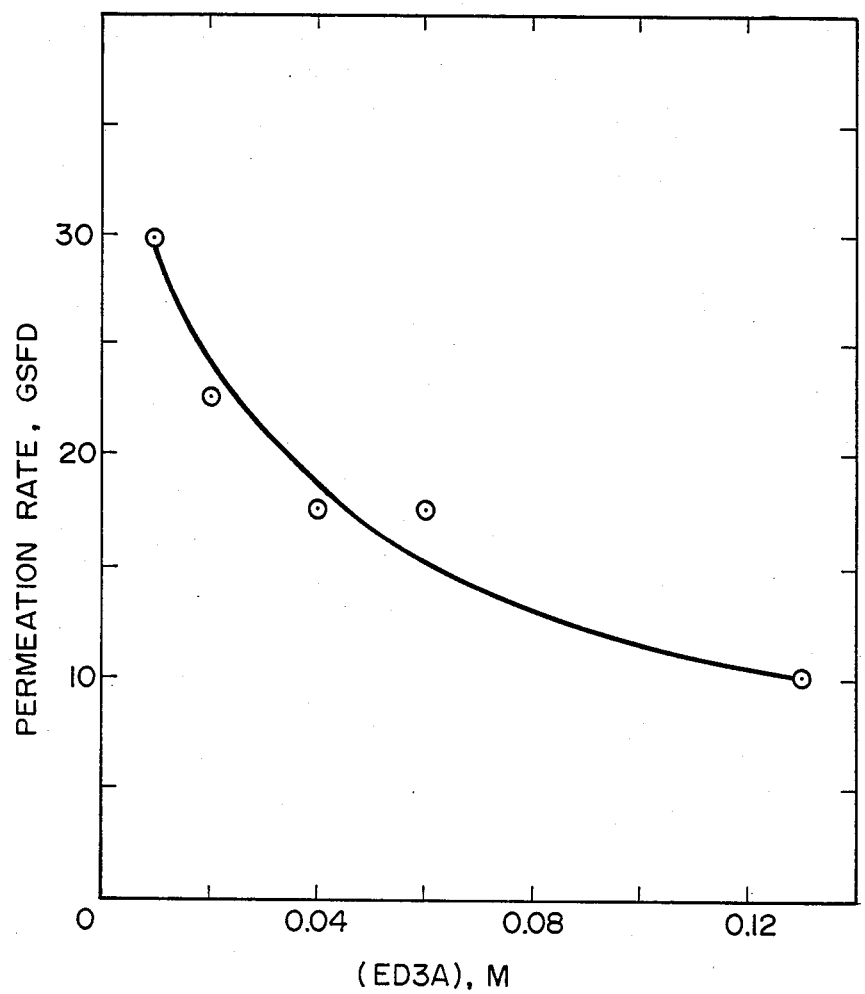

PROCESS AND COMPOSITION FOR REMOVAL OF METAL IONS FROM AQUEOUS SOLUTIONS

BACKGROUND OF THE INVENTION

1. Field of the Invention

This invention relates to a process for the selective removal of metal ions from an aqueous solution using a water-soluble polymeric chelant. The metal ion is chelated by the pendant chelating groups and then treated by separation means, such as dialysis or ultrafiltration, to remove water. The metal ion is then released from the chelate, generally using a dilute aqueous mineral acid, and separated. The chelant is then recycled and reused.

2. Description of the Relevant Art

A number of approaches have been reported to remove metal ions from aqueous solution.

K. S. Choi et al. in *Pollimo*, Vol. 5, No. 4, pp. 266–277 (1981) [See Chemical Abstracts, Vol. 96(2) 7417g] disclose a polymeric chelate for removing organic substances and heavy metallic ions from a water solution. A three-dimensional network structure is obtained by the reaction of polyethyleneimine with 2,4-tolylenediisocyanate. Silica gel and polysulfone bead-carriers coated with this polymer are used to remove heavy metal ions such as lead, cadmium, and mercury by adsorption. The polymer used is cross-linked and is insoluble in water.

I. Kiyota et al. in Japanese Kokai Patent No. JP 52/78291 (77/17291) [See Chemical Abstracts, Vol. 87, No. 22, 168863d] describe a number of complex polymer membranes. The polymer, including vinylpyridine, dimethylaminomethylstyrene, and dimethylaminomethylacrylate copolymer with unsaturated acids are quaternized with vinyl bromoacetate, alkyl halide, or p-chloromethylstyrene, complexed with polyamino compounds cast into fibers and cross-linked to produce membranes.

A. Stoy in U.S. Pat. No. 3,953,545 discloses polymers or copolymers (having nitrile side groups and strong acidic groups are contacted with silver or copper ions or their mixtures to produce silver and/or copper-containing polymers) useful as dialysis or filtration membranes, light-sensitive layers, catalysts, coatings, and the like.

In U.S. Pat. No. 4,254,087, R. R. Grinstead discloses a medium for the selective extraction of metal from aqueous acid solutions, such as leach liquors. The medium comprised (a) an alkylaromatic sulfonic acid with a molecular weight of at least 400, (b) a chelating amine having a pKa value for the amine group of 3–9 and having at least two coordinating centers in the molecule where at least one center is a ring nitrogen, and (c) a water-immiscible diluent for (a) and (b). The extractants are especially useful for the selective extraction of nickel, cobalt, or copper from aqueous acid and leach liquors containing another metal.

In U.S. Pat. No. 4,356,309, J. W. Falk et al. disclose the use of an N-alkylated-2-(2-pyridyl)imidazole compound as a selective extractant for cobalt, copper, and nickel from aqueous solutions.

Japanese Patent No. 60118288, a patent assigned to NEC Corporation discloses a process for the removal of iron and calcium and other metal ions such as nickel, zinc, copper, cadmium, lead, cobalt, and the like using a complexing agent such as amino carboxylic acid, nitrilotriacetic acid, hydroxycarboxylic acid, citric acid, tartaric acid, etc.) The metal complex is insoluble and is precipitated from solution.

The above references do not disclose a process for the removal of metal ions from aqueous solutions as is described in the present invention. It is extremely useful to have a single-phase reaction to remove metals from aqueous solution which is faster than existing systems.

SUMMARY OF THE INVENTION

The present invention relates to a process for the removal of metal ions from a fluid stream comprising metal ions, which process includes:

(A) contacting the fluid stream in a contacting zone with an aqueous reaction solution at between about 10° C. and 90° C. for a time sufficient to chelate the metal ions, the reaction solution itself comprising an amount, effective to chelate the metal ions present, of water-soluble organic polymeric chelant selected from organic polymeric chelants of the formula:

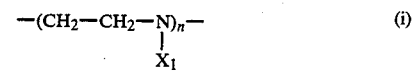

wherein $X_1$ in each unit of the polymer is independently selected from -H or a substituent selected from $-CH_2COOH$, $-CH_2-P(=O)(OH)_2$,

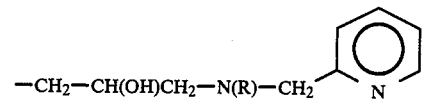

wherein R is alkyl, aminoalkyl, hydroxyalkyl, sulfoalkyl, or carboxyalkyl, and alkyl in these substituents contains from one to four carbon atoms; or from

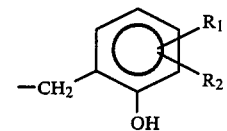

wherein $R_1$ and $R_2$ are each independently $-CH_3$, $-SO_3H$, $-Cl$, $-H$, or $-COOH$; and n is an integer between about 5 and 20,000;

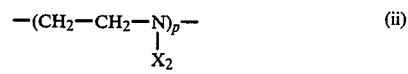

wherein p is an integer between about 5 and 20,000; and wherein $X_2$ in each polymer unit is each independently selected from $H-$ or a substituent selected from:

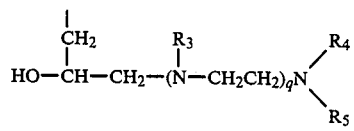

wherein $R_3$, $R_4$, and $R_5$ are each independently selected from $-H$, $-CH_2COOH$, or $-CH_2P(=O)(OH)_2$ and q is 0, 1, 2, 3, or 4;

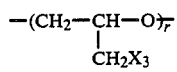 (iii)

wherein r is an integer between about 10 and 20,000 and $X_3$ in each polymer unit is independently selected from H— or a substituent selected from:

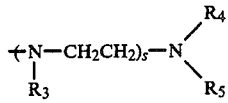

wherein $R_3$, $R_4$, and $R_5$ are as defined hereinabove, and s is an integer between about 1 and 4; or

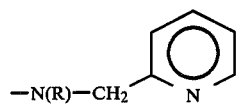

wherein R is as defined hereinabove;

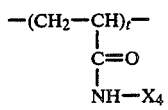 (iv)

wherein t is an integer between about 10 and 20,000; and $X_4$ in each polymer unit is independently selected from H— or a substituent selected from:

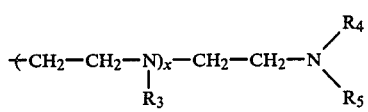

wherein x is an integer between 1 and 4; and $R_3$, $R_4$ and $R_5$ are as defined hereinabove; or from

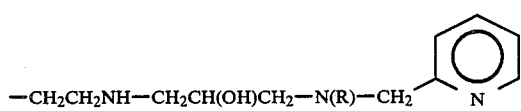

wherein R is as defined hereinabove;

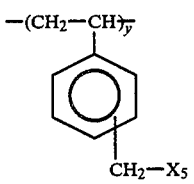 (v)

wherein y is an integer between about 10 and 20,000; and $X_5$ in each polymer unit is independently selected from —H or a substituent selected from:

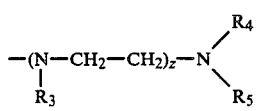

wherein z is an integer between about 1 and 4; and $R_3$, $R_4$ and $R_5$ are as defined hereinabove; or

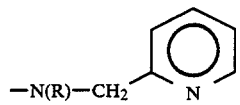

wherein R is as defined hereinabove;

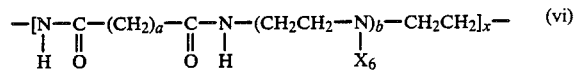 (vi)

wherein a is 6 and b is 1 to 4, and $X_6$ in each polymeric unit is independently selected from —H or a substituent selected from:

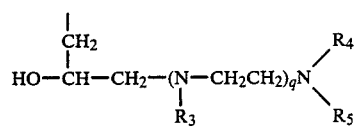

wherein q is 1 to 4, and $R_3$, $R_4$ and $R_5$ are as defined hereinabove; or

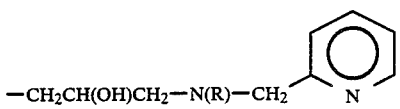

wherein R is as defined hereinabove; and x is between about 10 and 10,000;

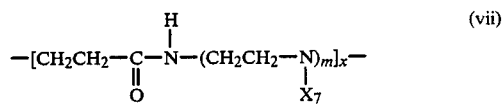 (vii)

wherein $X_7$ in each polymeric unit is independently selected from —H or a substituent;

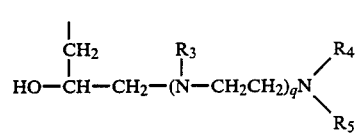

wherein q and $R_3$, $R_4$ and $R_5$ are defined hereinabove; or

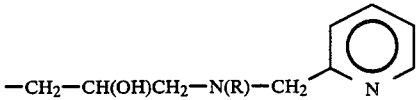

wherein R is as defined hereinabove; and m is an integer from 1 to 4 and x is defined hereinabove;

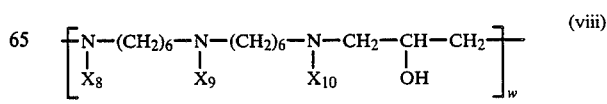 (viii)

wherein $X_8$, $X_9$, and $X_{10}$ are each independently selected from —H or a substituent selected from:

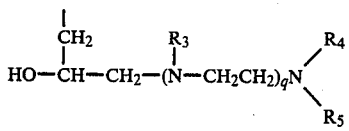

wherein q, $R_3$, $R_4$ and $R_5$ are as defined hereinbove, or

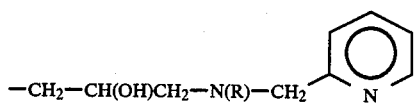

wherein R is as defined hereinabove; and w is between about 10 and 10,000;
with the proviso that the overall ratio of H to substituent in $X_1$, H to substituent in $X_2$, H to substituent in $X_3$, H to substituent in $X_4$, H to substituent in $X_5$, H to substituent in $X_6$, H to substituent in $X_7$, —CH$_2$CH(OH)CH$_2$OH or —CH$_2$CH(OH)CH$_2$Cl to substituent in each of $X_8$, $X_9$ or $X_{10}$ in each organic polymeric chelant described hereinabove is between about 10/90 and 90/10;

(B) treating the aqueous solution produced in step (A) by separation means effective to remove water and other monomeric reaction products from the aqueous solution;

(C) contacting the concentrated aqueous solution produced in step (B) with a mineral acid under conditions effective to release the metal ion from the chelant; and (D) removing the released metal ion by a second means effective to separate the released metal ion;

(E) recycling the concentrated aqueous solution from step (D) to the contacting zone of step (A).

In a preferred embodiment in step (B) the aqueous solution is concentrated by separation means selected from ultrafiltration and dialysis.

In another preferred embodiment the metal ions are selected from iron, cobalt, chromium, vanadium, copper, cadmium, nickel, zinc, lead, aluminum, mercury, silver, manganese, calcium or magnesium. A more preferred group of metal ions is selected from copper, nickel, chromium, zinc, mercury or cadmium.

In yet another preferred embodiment, the chelant is polymer of structure (viii), particularly wherein the $X_8$, $X_9$ and $X_{10}$ substituents are selected from —CH$_2$CH(OH)CH$_2$OH, —CH$_2$CH(OH)CH$_2$Cl, or

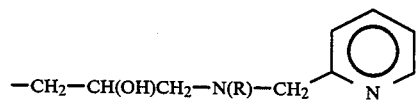

and R is alkyl, especially methyl.

Especially preferred embodiments in all polymers are those wherein $X_1$,—$X_{10}$ are either —H or a substituent wherein the substituent contains the pyridyl group

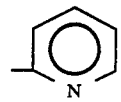

where R is alkyl, especially methyl.

For $R_3$, $R_4$ and $R_5$ in the pendant group, —CH$_2$COOH is preferred in all polymers.

BRIEF DESCRIPTION OF THE DRAWINGS

FIG. 7 shows the effect of polymer concentration on permeation rate.

DETAILED DESCRIPTION AND PREFERRED EMBODIMENTS

This section is organized in the following order: the fluid streams, the water-soluble chelants, the metals, and the separation means. In the following section regarding the Figures, this removal process and results are discussed.

Fluid streams—In the present invention "fluid streams" refers to any gaseous, liquid or combination gaseous liquid stream. Typical fluid streams include, for example, mining run-off, mine water, pickling solution, plating wastes, domestic wastes, sewage, industrial process water, oil well brine and the like.

Water Soluble Chelants—Any otherwise inert water-soluble polymeric chelant capable of chelating a polyvalent metal ion is suitable in the present process. "Inert" in this context is defined as not detrimentally reactive in the reaction to an intolerable extent. Polymeric chelants having a molecular weight of between about 600 and 1,000,000 are preferred in the present process. Polymeric chelants having a molecular weight of between about 1000 and 500,000 are more preferred.

Those water soluble polymers having a backbone chain with pendant groups capable of chelating metal ions are preferred. More preferred water soluble polymeric chelants include those having repeating polymeric groups described in the SUMMARY hereinabove.

It is also contemplated that mixtures of the water-soluble organic polymeric chelants described are useful. The concentration of the polymer in the aqueous solution should be at a level so as to provide between about 0.01 to 0.5 molar of chelate groups tied to the polymer.

Figure 1:
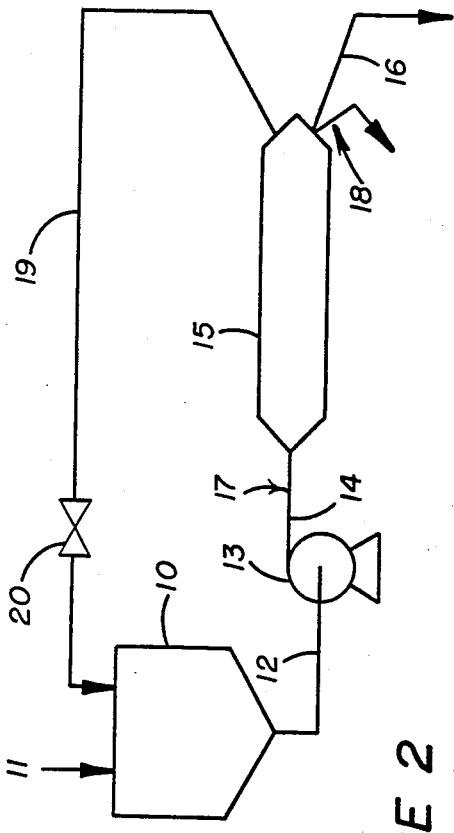
FIG. 1 illustrates a process in which an aqueous solution of organic polymeric chelant is combined with an aqueous solution comprising metal ions with the removal of the water and low molecular weight species and with separation of the metal ions.

Referring to FIG. 1, the process for recovering the metal ions includes the following steps: A feed solution containing one or more metal ions is added via line 11 to a solution of the water soluble polymeric chelant in tank 10. The polymer concentration is between about 0.1 to 25 percent by weight, preferably 5 to 10%. This reaction mixture is conveyed via line 12, pump 13 and line 14 to separation means 15. Generally, the separation means 15 preferably is a dialysis or ultrafiltration membrane, having a molecular weight cut off less than the molecular weight of the polymeric chelate. The separation is normally accomplished by recirculating the mixture through the membrane device having a throttle valve 20 in line 19 to maintain a pressure of between about 10 and 100 psi in the membrane unit about 30 psig is preferred. A reservoir tank 10 is included.

The aqueous solution which permeates through the membrane is collected as effluent in line 16 which is virtually free of those metal ions which are chelated by the polymer.

After the water soluble polymer has reacted with sufficient metal ions to become saturated resulting in the appearance in the aqueous permeate of the metal ions, the feed is discontinued and replaced with a regenerating material.

The regenerating material is usually a dilute mineral acid or ammonium hydroxide, in concentrations of between about 1 and 6N, and is usually added through line 17. This step liberates the metal from the polymer-metal chelate so that the concentrated metal ion and solution is free to permeate through the membrane and be collected in line 16 (or optionally line 18). The polymer chelant is then returned to the original feed and recycled.

The temperature of the process is between about 0° and 100° C., preferably between about 10° and 90° C. The metal ion level in the feed solution is any amount up to about one-tenth the equivalent molar concentration of the chelant in the cell, but preferably is in the range of less than about 10 g/l, more preferably less than about 1 g/l. Other components of the feed solution may include inorganic salts of all kinds and organic compounds, whose individual molecular weights are generally no more than about one-tenth of the molecular weight cutoff value of the membrane.

A more detailed description of the preparation for these vaarious organic polymeric chelants is provided below and as part of the Examples. In the preparation of these chelants the pendant groups are added to active —H or the like on the backbone of the polymer. Not all of these sites are reacted to give the pendant group, therefore some —H or the like will remain. Some polyamines and polyethers used in synthesis are described in Table 1 below.

TABLE 1

POLYAMINES USED AS STARTING MATERIALS FOR POLYCHELATOR SYNTHESIS

| Amine[a] | Degree of Polym. (D.P.) | Molecular Weight Range | Nature of Chain |
|---|---|---|---|
| E-100[b] | 6 | 250–300 | Branched |
| PEI-6 | 15 | 600 | Branched |
| Hydrolyzed PEOx | 50[c] | 2000 | Linear |
| Purifloc C-31[d, e] | 500 | 10,000–30,000 | Branched |
| Hydrolyzed PEOx | 500[f] | 20,000 | Linear |
| PEI-600 | 1500 | 60,000 | Branched |
| Hydrolyzed PEOx | 5000[g] | 500,000 | Linear |

[a]PEI = polyethyleneimine; PEOx, polyethyloxazoline. PEI is a polymer of molecular weight 60,000 (CORCAT 600) and is obtained from Cordova Chemical Company. The nitrogen content is determined by drying a sample, and elemental analysis of the solid.
[b]E-100 - is a byproduct of ethylenediamine manufacture and is a low molecular weight branched polymer containing about six ethyleneamine groups.
[c]100% hydrolyzed
[d]Purifloc C-31 - is a polyethylene amine product of the Dow Chemical Company, Midland, Michigan.
[e]Probably also partially crosslinked.
[f]85% hydrolyzed
[g]97% hydrolyzed One embodiment of the chelant designated (i) $[CH_2CH_2(X_1)]_n$—, where $X_1$ is —$CH_2COOH$ (CHELANT A) is prepared by dissolving polyethylenimine (PEI 150 or PEI 600, available from the Dow Chemical Company) in water followed by reaction with excess sodium chloroacetate in the presence of strong base.

Another embodiment of the polymeric chelant designated (i) where $X_1$ is —$CH_2P(=O)(OH)_2$ (CHELANT B) is prepared by dissolving polyethyleneimine in water and reaction with phosphoric acid and formaldehyde. The process described by R. S. Mitchell in U.S. Pat. No. 3,974,090 for the monomer may be adapted using the polymeric imine.

A further embodiment of the polymeric chelant (i) where $X_1$ is:

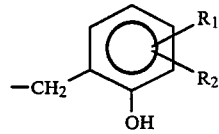

and $R_1$ and $R_2$ are each methyl (CHELANT C), is obtained by dissolving polyethyleneimine in water followed by treatment with 2,4-dimethylphenol and formaldehyde. The general procedure described by G. Grillot and W. Gormley, Jr., *J. Amer. Chem. Soc.*, Vol. 67, pp. 1968 ff (1945) for the monomer is adapted using the polymeric imine, and is incorporated herein by reference.

Generally, the ratio of H— to substituent in $X_1$ in the polymer (i) is between about 10/90 and 90/10 for each polymer. Preferably, the ratio is between about 10/90 and 40/60.

One embodiment of the polymeric chelant designated (ii) where $X_2$ is a substituent and $R_3$, $R_4$ and $R_5$ are —$CH_2COOH$ and q is 1 (CHELANT D), is obtained by first reacting epichlorohydrin,

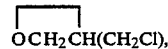

with ethylenediaminetriacetic acid to produce Cl—CH$_2$—CH(OH)CH$_2$—N—(CH$_2$COOH)CH$_2$CH$_2$N(CH$_2$COOH)$_2$, followed by reaction with polyethyleneimine. For those polymers where q is 2, 3 or 4, the ethylenediamine is replaced with the corresponding diethylenetriamine, triethylenetetraamine and tetraethylenepentamine, respectively.

Another embodiment is of the polymeric chelant designated (ii) where $X_2$ is substituent, p is about 2,000, q is 0, and $R_4$ and $R_5$ are each $-CH_2COOH$. (CHELANT D-1), Iminodiacetic acid is dissolved in water and epichlorhydrin, about a 20% excess is added. The product is extracted with a chlorinated hydrocarbon such as methylene chloride to remove the unreacted epichlorhydrin. To this aqueous solution is added a 33% aqueous solution of polyethyleneimine e.g., CORCAT 600, heated and further treated with sodium hydroxide at a pH of 9-10. The chelant solution is used without further purification. Generally, the ratio of H— to substituent in $X_2$ in the polymer is between about 10/90 and 90/10. Preferably the ratio is between about 10/90 and 40/60.

One embodiment of the polymeric chelant designated (iii) where $X_3$ is substituent, $R_3$, $R_4$ and $R_5$ are each $-CH_2COOH$ (CHELANT E) is prepared by treating polyepichlorohydrin with ethylenediamine in the presence of base followed by treatment with excess sodium chloroacetate. Generally, the ratio of H— to substituent in $X_3$ in the polymer is between about 10/90 and 90/10. Preferably the ratio is between about 10/90 and 40/60.

One embodiment of the chelant designated (iv) where t is 100, $X_4$ is $-[CH_2CH_2N(R_3)]_x-CH_2CH_2N(R_4)R_5$; x is 1 and $R_3$, $R_4$ and $R_5$ are each $-CH_2COOH$ (CHELANT F) is prepared by the treatment of poly(methylacrylate) with ethylenediamine followed by treatment with sodium chloroacetate in the presence of a strong base.

In a second embodiment of the chelant designated (iv) where t is 100, $X_4$ is $-CH_2-CH_2NH_2$ or $-CH_2CH_2NH-CH_2CH(OH)CH_2N(R)-CH_2-C_5H_4N$, poly(methyl acrylate) is treated with ethylenediamine (R=CH_3). The product is treated with the compound formed by the reaction of epichlohydrin with N-methyl-2-picolylamine. Generally, the ratio of H— or $-CH_2CH_2NH_2$ to substituent in $X_4$ in either polymer is between about 10/90 and 90/10. Preferably the ratio is between about 10/90 and 40/60.

The sulfoalkyl group, $RSO_3H$, where R is defined alkyl having 1 to 4 carbon atoms is added to the amine by methods known in the art.

One embodiment of the chelant designated (v) where $X_5$ is $-[N(R_3)CH_2CH_2]N(R_4)R_5$; $R_3$, $R_4$ and $R_5$ are each $-CH_2COOH$, y is 100 and z is 1 (CHELANT G) is the treatment of poly(vinylbenzylchloride) with ethylenediamine in the presence of strong base. The product in the presence of base, is next treated with excess sodium chloroacetate. By replacement of ethylenediamine with diethylenetriamine, triethylenetetraamine, and the like, the higher homologues are produced. Generally the ratio of H— to substituent in $X_5$ is between about 10/90 and 90/10. Preferably, the ratio is between about 10/90 and 40/60.

One embodiment of the chelant designated as (vi) where $X_6$ is $-CH_2CH(OH)CH_2-(N(R_3)CH_2CH_2)_qN(R_4)(R_5)$ where $R_3$, $R_4$ and $R_5$ are $-CH_2COOH$ and q is 1 (CHELANT H) is obtained by the treatment of the commercial polymer KYMENE 557H which is obtained from the Hercules Corporation of Wilmington, Del., with ethylenediamine triacetic acid. Generally the ratio of H— to substituent in $X_6$ in the polymeric chelant is between about 10/90 and 90/10. Preferably the ratio is between about 10/90 and 40/60.

One embodiment of the chelant designated as (vii) where $X_7$ is $-H$ or $-CH_2CH(OH)CH_2[N(R_3)CH_2CH_2]_qN(R_4)(R_5)$, and q=1 and $R_3$, $R_4$ and $R_5$ are each $-CH_2COOH$ (CHELANT J), is obtained by reacting the polymer obtained from the reaction with methylacrylate and ethylene diamine and the compound formed by the reaction of epichlorhydrin and N-methyl picoline (CHELANT J). Generally the ratio of $-H$ to substituent in the polymer is between about 10/90 and 90/10. A preferred ratio is between about 10/90 and 40/60.

One embodiment of the chelant designated (viii) where $X_8$, $X_9$ and $X_{10}$ are $-CH_2CH(OH)CH_2OH$, $-CH_2CH(OH)CH_2Cl$ or substituent $-CH_2CH(OH)CH_2-[N(R_3)CH_2CH_2]_qN(R_4)(R_5)$, where $R_3$, $R_4$ and $R_5$ are $-CH_2COOH$ and q is 1, the polymer, as the adduct is obtained by reacting the commercially available FIBRABON 35 from the Diamond Shamrock Co., with ethylenediaminetriacetic acid in the presence of base (CHELANT K). Generally the ratio of each of $X_8$, $X_9$ and $X_{10}$ are independently selected between $-CH_2CH(OH)CH_2OH$, $-CH_2CH(OH)CH_2Cl$, or substituent is between about 10/90 and 90/10. Preferably the ratio is between about 10/90 and 40/60.

Those pendant groups having a pyridine ring are preferred in a polymer.

A more detailed description of the preparation for these and other organic polymeric chelants is provided below as part of the Examples.

The Polyvalent Metals

Generally, any polyvalent metal chelatable (e.g., transition metal) in both oxidized and reduced states can be separated in the present invention as the metal ion of polymeric chelate. Iron, copper, chromium, nickel, zinc, lead, cadmium, and manganese are preferred. Copper is particularly preferred.

Separation Means for Water and Low Molecular Weight Materials

The means to separate the organic polymeric chelate from the water and water-soluble low molecular weight products and materials can employ any single or combination of techniques suitable for this purpose. Preferably ultrafiltration and/or dialysis are used. More preferably, ultrafiltration is employed using a membrane consisting of any of a variety of synthetic polymers, in the shape of a film, hollow fiber or the like. Particularly useful for the removal of water and low molecular weight materials of molecular weight of 500 or less (preferably 1000 or less) while retaining the water-soluble polymeric chelate are membranes, such as Spectrapor 6 (2000 molecular weight maximum permeability). Amicon Ultrafiltration Diaflo Flat Sheet or Hollow Fiber having a variety of cut-off molecular weights are also used.

The use of ultrafiltration membranes in the separation of components of an aqueous solution is described by R. R. Klinkowski in *Kirk Othmer: Encyclopedia of Chemical Technology*, 3rd Ed., Vol. 23, pp. 439-461, 1981, which is incorporated herein by reference.

The following Examples are to be construed as being illustrative and are not limiting in any way.

EXAMPLE 1

Organic Polymeric Chelant (i)

[CHELANT A: $X_1 = -CH_2COOH$]

(a) Polyethyleneimine 11 g [degree of polymerization (DP) 1500] is dissolved in water (200 ml) to produce a solution of 1.25 molar (in amine nitrogen). To the aqueous solution is added sodium chloroacetate (31 g, a 5% excess) with stirring while maintaining the reaction mixture at about 60° C. A pH electrode is used to monitor the reaction and 50% sodium hydroxide is added to maintain the pH above about 10. After 40 minutes, the reaction is complete, and the reaction mixture is allowed to cool. The aqueous solution is diluted to 1.0M (amine nitrogen) and used without further purification.

(b) [CHELANT AA: $X_1 = -CH_2CH(OH)CH_2-N(CH_3)-CH_2-C_5H_4N$]

N-methyl picolylamine (30.5 g., 0.25 mole) is dissolved in 150 ml of water. To this solution is added 0.3 mole of epichlorhydrin, about a 20% excess. After allowing the solution to stir for an hour at ambient temperature, it is extracted twice with 50 ml of methylene chloride to remove the unreacted epichlorhydrin.

Polyethyleneimine (11 g., 0.25 mole of monomer units) of D.P. 1500 is dissolved in 200 ml of water to produce a solution of 1.25M (in amine nitrogen). To this solution is added the picolylamine/epichlorhydrin compound described above with stirring. The temperature is maintained at about 60° C. and a pH electrode is used to monitor pH, while adding 50% NaOH to maintain a pH of about 10. After an hour the reaction is complete, and the reaction mixture is allowed to cool. The aqueous solution is used directly without further purification or dilution.

EXAMPLE 1A

Preparation of Polymeric Chelant (i)

[CHELANT B: $X_1 = -CH_2P(=O)(OH)_2$]

(a) To a 500 ml flask equipped with a water condenser and dropping funnel are added 99 g (0.6 mole) of 49.9% orthophosphorous acid (which also contains 9.4 g of hydrogen chloride) and 5.2 g of 37% hydrochloric acid. The total mole of hydrogen chloride used is 0.4. The resultant mixture is then allowed to heat by the addition of 14 g of CORCAT 150 (Cordova Chemical Co.) as a 33% aqueous solution of polyethyleneimine containing 0.1 mole of amine nitrogen. The polyamine is added over a period of 8 to 10 minutes while the reaction mixture achieves a temperature of about 70°-75° C. The reaction mixture is then heated for about 20 minutes to the boiling temperature thereby producing a homogeneous clear solution having a boiling point of between 110°-115° C. The resulting clear aqueous solution is maintained at boiling for about 2 hrs., and 22 g (0.66 mole) of paraformaldehyde is added. After the 2-hr. period, the clear reaction mixture is kept boiling for an additional 30 min and cooled to about 25°-30° C. The clear solution has an amber color, and contains about 50% by weight of the polyethyleneimine phosphate which is used without further purification.

EXAMPLE 1B

Preparation of Polymeric Chelant (i)

[CHELANT C: $X_1$ is 6-methylene-2,4-dimethylphenol]

(a) To a 13 g aqueous solution (33%) of polyethyleneimine CORCAT 150 (from Cordova Chemical Company) containing 0.1 mole of available amine nitrogen is added 10.8 g of 2,4-dimethyl phenol (0.1 mole). The solution is maintained below 20° C., while a 37% aqueous formaldehyde solution (0.11 mole) is added slowly with stirring. The solution is allowed to stand for an hour at ambient temperature and then warmed to 80° C. for 2 hrs. The aqueous solution is used without purification in subsequent experiments.

EXAMPLE 2

Preparation of Polymeric Chelant (ii)

[CHELANT D: $X_2$ is substituent and $R_3$, $R_4$ and $R_5$ are $-CH_2COOH$]

This preparation is performed in two steps: (1) attachment of ethylenediamine to the polymer; and (2) conversion of the amine to the ethylenediaminetriacetic acid (ED3A).

Step 1: 23.5 Grams of polyepichlorhydrin (0.25 Mole monomer unit) and 94 grams of 85% ethylenediamine (1.3 moles) are dissolved in 50 ml isopropanol and 25 ml of toluene and refluxed (about 100° C.) for six hrs. As the reaction proceeded additional isopropanol is added to maintain homogeneity, with the final system being about 75/25 isopropanol/toluene. The reaction is followed by titrating aliquots for chloride ion with silver nitrate. Next, 20 grams of 50% NaOH (0.25 mole) is added, the solid NaCl which formed is filtered, washed with ethanol, and the liquid is removed in a vacuum evaporator at 55° C. Although some NaCl remained in the product, the elemental analysis gave a C:H:N mole ratio of 4.6:12.1:2.00 (Expected mole ratio was 5:12:2).

Step 2: This intermediate is taken up in about 200 ml of water, to which 3.3 moles of sodium chloroacetate is added per mole of nitrogen. The system is kept at about 60° C. and a pH of about 10 for about one hr. At this point a white precipitate (presumably NaCl) is filtered off, the pH is adjusted to about 2 (the expected isoelectric point), at which point considerable white solid forms. This solid is filtered and found to be EDTA, presumably formed because all of the unreacted ethylenediamine had not been removed during the vacuum evaporation. The filtrate is dialyzed against about 4 liters of water.

An estimate of the EDTA content of the dialyzed (polymeric) material is made by titrating an aliquot with iron (III). About one-third (33%) of the expected chelant groups are found in the polymer fraction.

(b) [CHELANT DD: $X_1 = -CH_2-CH(OH)-CH_2-N(CH_3)CH_2-C_5H_4N$]

23.5 grams of polyethyleneimine (0.25 mole monomer unit) and 94 g the compound of epichlorhydrin and N-methylpicolylamine (1.3 mole) are dissolved in 50 ml of isopropanol and 25 ml of toluene and refluxed (about 100° C.) for 6 hrs. As the reaction proceeds, additional isopropanol is added to maintain homogeneity. The reaction is followed by titrating aliquots for chloride ion with silver nitrate. Then 20 g of 50% NaOH (0.25 mole) are added and the solid NaCl which is formed is filtered, washed with ethanol, and the liquid is removed in vacuum. This material is taken up in water and is used directly without further purification.

EXAMPLE 2A

Preparation of Polymeric Chelant (ii)

[CHELANT D-1: p=2,000, q=0 and $R_4$ and $R_5$ are $-CH_2COOH$]

(a) 14.3 Grams (0.1 mole) of iminodiacetic acid is dissolved in 100 ml of water. To this solution is added 0.12 mole epichlorhydrin, about a 20% excess. After allowing the solution to stand for an hour at ambient temperature it is extracted with 50 ml of methylene chloride to remove the unreacted epichlorhydrin. To the aqueous phase from this extraction is added 14.7 grams of a 33% solution of polyethyleneimine COR- CAT 600 (Cordova Chem. Co., Muskegon, Mich.), an amount determined to contain 0.1 mole of nitrogen. The solution is heated to 60° C., while sodium hydroxide solution (10N) is added at a rate sufficient to maintain the pH in the range of 9-10. After about 30 minutes the reaction is complete and the resulting solution, which now contains the polyethyleneimine with iminodiacetic acid groups attached to it, is used without purification in subsequent experiments.

EXAMPLE 3

Preparation of Polymeric Chelant (iii)

[CHELANT E: $R_3$, $R_4$ and $R_5$ are $-CH_2COOH$]

(a) 224 Grams (0.1) of ethylenediamine triacetic acid is dissolved in 100 ml of water. To this solution is added 0.12 mole of polyepichlorohydrin, about a 20% excess [HYDRIN 10×1 (DP/40)], from B. F. Goodrich Co., Cleveland, Ohio, is dissolved in toluene/methylene chloride (50/50; v/v). Tetrabutylammonium chloride (0.01 mole) is added as a phase transfer catalyst. The solution is stirred for about an hour at ambient temperature. The HCl produced is taken up by the addition of sodium hydroxide. The aqueous polymeric chelant is subsequently used without purification.

(b) [CHELANT EE: $X_3 = -N(CH_3)CH_2-C_5H_4N$]

23.5 Grams of polyepichlorohydrin (0.25 Mole monomer unit) and 94 grams of N-methylpicolylamine (1.3 mole) are dissolved in 50 ml isopropanol and 25 ml of toluene and refluxed (about 100° C.) for six hr. As the reaction proceeds, additional isopropanol is added to maintain homogeneity, with the final system being about 75/25 isopropanol/toluene. The reaction is followed by titrating aliquots for chloride ion with silver nitrate. Next, 20 grams of 50% NaOH (0.25 mole) are added, the solid NaCl which formed is filtered, washed with ethanol, and the liquid is removed in a vacuum evaporator at 55° C. This material is taken up in water and used directly without further purification.

EXAMPLE 4

Preparation of Polymeric Chelant (iv)

[CHELANT F: $R_3$, $R_4$ and $R_5$ are $-CH_2COOH$, t is 100 and x is 1]

(a) Poly(methyl acrylate (86 g., equivalent to one formula weight of the monomeric methyl acrylate) is dissolved in about 300 ml of toluene, and 520 g of diethylenetriamine (5 moles) are added. The solution is heated to 40°-50° C. for an hour and the excess amine and toluene are evaporated under vacuum. The residue is taken up in 500 ml of water and 348 g. of sodium chloroacetate (3.0 mol) are added to the solution, and heated to about 60° C. for about 30 minutes while sodium hydroxide is added at a rate sufficient to maintain the pH at 9-10. This solution, which had the desired structure is used without further purification in subsequent experiments.

(b) [CHELANT FF: $X_4 = -CH_2CH_2NHCH_2CH(OH)CH_2N(CH_3)CH_2-C_5H_4N$]

Poly(methyl acrylate)(22 g equivalent to 0.25 formula weight of the monomeric methyl acrylate) is dissolved in 100 ml of toluene and 75 g (1.25 mole) of ethylenediamine are added. The solution is heated to 40°-50° C. for 1 hr, and the excess amine and toluene are evaporated in a vacuum. The residue is taken up in 500 ml of water.

N-methylpicolylamine (30.5 g, 0.25 mole) is dissolved in 150 mm of water. To this solution is added 0.3 mole of epichlorhydrin, about a 20% excess. After allowing the solution to stir for an hour at ambient temperature, it is extracted twice with 50 ml of methylene chloride to remove the unreacted epichlorhydrin. This solution is added to the acrylate/ethylenediamine intermediate prepared above with stirring. The temperature is maintained about 60° C. A pH electrode is used to monitor pH at about 10 while adding 50% aqueous NaOH. After about an hour, the reaction is complete, the reaction mixture is allowed to cool, and is used directly without further purification.

EXAMPLE 5

Preparation of Polymeric Chelant (v)

[CHELANT G: $R_3$, $R_4$ and $R_5$ are $-CH_2COOH$, y is 100 and z is 1]

(a) Polyvinylbenzyl chloride (15 g., equivalent to 0.1 mole of monomer units) is dissolved in 100 ml of methylene chloride, and 30 g of ethylenediamine (0.5 mole) were added. The solution is warmed to 40° C. and stirred for 2 hours. The excess amine and methylene chloride are evaporated under vacuum. The resulting polymer is taken up in 200 ml of water and carboxymethylated as in the preceding example. The resulting polymer has the desired structure and is used further without purification.

(b) [CHELANT GG: $X_5 = -N(CH_3)CH_2-C_5H_4N$]

Polyvinylbenzyl chloride (15 g., equivalent to 0.1 mole of monomer units) is dissolved in 100 ml of methylene chloride, and 60 g of N-methylpicolylamine (0.5 mole) were added. The solution is warmed to 40° C. and stirred for 2 hrs. The excess amine and methylene chloride are evaporated under vacuum. The resulting polymer is taken up in 200 ml of water. The resulting polymer has the desired structure and is used further without purification.

EXAMPLE 6

Preparation of Polymeric Chelant (vi)

[CHELANT H: $R_3$, $R_4$ and $R_5$ are $-CH_2COOH$]

(a) Eighty grams of the polymer KYMENE 557H (0.1 mole monomer equivalent)(Hercules Corporation, Wilmington, Del.), which is a copolymer of adipic acid, diethylenetriamine and epichlorohydrin was added to a solution of 46 g of ethylenediaminetriacetic acid in about 200 ml of water (a twofold excess). The solution was heated to 80° C. for two hours. The resulting solution which contained the desired polymer (vi) was used without further purification in subsequent experiments.

(b) [CHELANT HH: $X_6 = -N(CH_3)CH_2-C_5H_4N$]

This chelant is prepared as is described above in subpart (a) except that a stoichiometrically equivalent amount of $NH(CH_3)CH_2C_5H_4N$ is used instead of ethylenediaminetriacetic acid.

EXAMPLE 7

Preparation of Polymeric Chelant (vii)

[CHELANT J: $R_3$, $R_4$ and $R_5$ are $-CH_2COOH$]

(a) A solution of an adduct of epichlorohydrin and iminodiacetic acid, as prepared in Example 2A, was added to an equimolar quantity of a polymer solution made by reacting equimolar quantities of methyl acrylate and ethylenediamine. The solution was heated to 80° C. for 2 hours, and the resulting polymer was used in subsequent experiments.

(b) [CHELANT JJ: $X_7$=—$CH_2CH(OH)CH_2N(CH_3)CH_2$—$C_5H_4N$]

Eighty grams of the polymer KYMENE 557H (0.1 mole monomer equivalent)(Hercules Corporation, Wilmington, Del.), which is a copolymer of adipic acid, diethylenetriamine and epichlorhydrin was added to a solution of 24 g of N-methylpicolylamine in about 200 ml of water (a twofold excess). The solution was heated to 80° C. for two hours. The resulting solution which contained the desired polymer was used without further purification in subsequent experiments.

EXAMPLE 8

Preparation of Polymeric Chelant (viii)

[CHELANT K: $X_8$, $X_9$, $X_{10}$ are either
—$CH_2CH(OH)CH_2OH$, —$CH_2CH(OH)CH_2Cl$, or
—$CH_2CH(OH)CH_2[N(CH_2COOH)CH_2CH_2N](CH_2COOH)_2$]

Fifty four grams of the commercial polymer FIBRABON 35 (Diamond Shamrock Corporation, Cleveland, Ohio) which contained 100 millimoles of active epichlorhydrin groups, was mixed with a solution of 46 grams of ethylenediaminetriacetic acid (0.2 mole), the solution was heated to 60° C. and sodium hydroxide was added at a rate sufficient to maintain the pH at about 9–10. After about 2 hours, the reaction was over and the solution was used in subsequent experiments.

(b) Polymer of FIBRABON 35 and N-(2-Hydroxypropyl)-picolylamine

[CHELANT L: $X_8$, $X_9$, $X_{10}$ are either
—$CH_2CH(OH)CH_2OH$, or
—$CH_2CH(OH)CH_2N(CH_3)CH_2$—$C_5H_4N$]

Twenty seven grams (containing 50 mmole of amine nitrogen) of commercial FIBRABON 35 (from Diamond Shamrock Corporation, Cleveland, Ohio) is diluted to about 80 ml with water. To this solution is added 17 g (0.10 mol) of N-(2-hydroxypropyl)picolylamine (HPPA) and the temperature is maintained at 50°–52° C. at a pH of 8.5–8.7 for about 80 minutes by addition 6N sodium hydroxide. The solution is freed of sodium chloride and unreacted N-(2-hydroxypropyl)-picolylamine by filtration in a ultrafiltration cell using a 10,000 molecular weight cutoff membrane. About 600 ml of water is passed through the cell. An ultraviolet analysis of the cell contents indicated the presence of about 12 mmole of N-(2-hydroxypropyl)picolyamine remains which is attached to the FIBRABON 35 polymer.

EXAMPLE 9

Removal of Copper from Aqueous Solution

A sufficient volume of a solution of the HPPA/FIBRABON 35 polymer from Example 8b to contain about 2.5 mmole of HPPA is placed in an ultrafiltration cell having a 10,000 molecular weight cutoff membrane of an area of 13 cm². A feed solution of the following composition is added to the ultrafiltration cell under a pressure of 30 psi (all as the sulfates) at a pH of 2.0: Copper, 0.94 g/l; Iron, 1.4 g/l; Aluminum, 1.7 g/l; Magnesium, 1.8 g/l.

Figure 3:
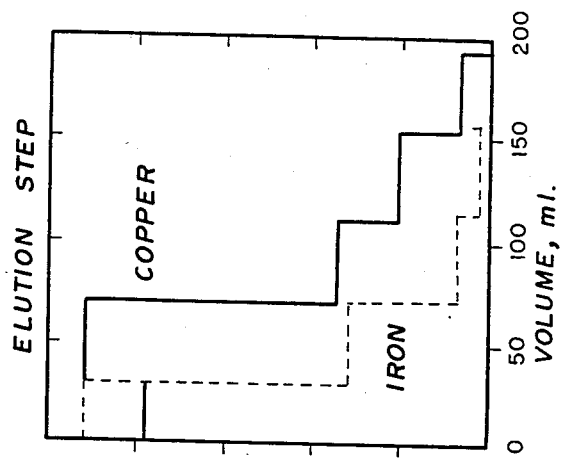
FIG. 3 shows a plot of the elution of the metal ion from the polymeric chelate using 2N sulfuric acid.
Figure 2:
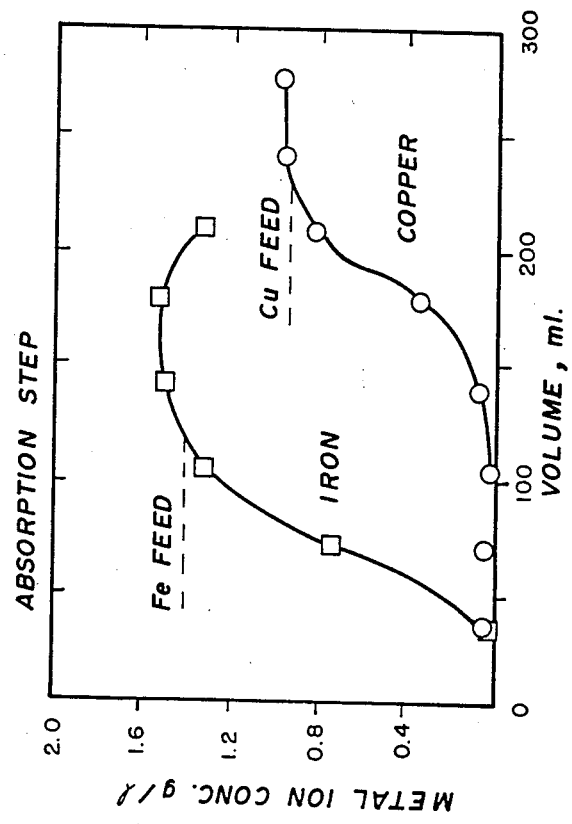
FIG. 2 shows a plot of the absorption of copper by a water-soluble chelant from a simulated mine water solution using HPPA/FIBRABON 35 as a water-soluble polymer.

The flow rate of the permeate from the cell is about 0.6 ml/min. The analysis of the metal content of the permeate produced the curves shown in FIG. 2 for Copper and Iron. About 150 ml of effluent is obtained free of copper/ion. A smaller volume is obtained free of iron ion indicating some removal of iron ion by the chelating polymer. After 1300 ml of solution is processed, it is replaced by 2N sulfuric acid. The copper ion and iron ion from the polymer complex are released and appear in the subsequent permeate (FIG. 3). Clearly there is more copper ion in the final product that iron, although there is more iron ion in the feed solution. This polymer is somewhat selective for copper ion.

EXAMPLE 10

REMOVAL OF COPPER, NICKEL, ZINC AND LEAD FROM AQUEOUS SOLUTION USING AN ULTRAFILTRATION/POLYCHELANT SYSTEM

A representative feed solution is prepared having the composition shown below in Table 2.

TABLE 2

| COMPOSITION OF FEED STREAM | |
|---|---|
| Species | Concentration, ppm |
| Cu | 0.87 |
| Ni | 2.2 |
| Pb | 0.8 |
| Zn | 2.5 |
| Mg | 226 |
| Ca | 116 |
| Na | 4000 |
| NH$_3$ | 15 |

All metal ions present as chlorides, pH 7–8

Figure 4:
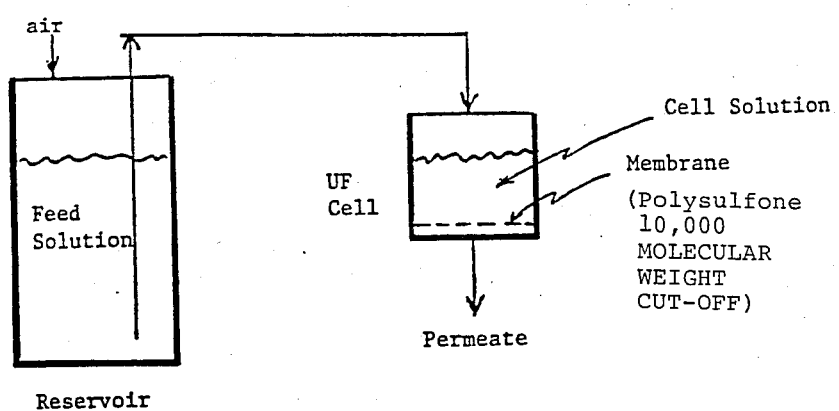
FIG. 4 shows the absorption of metal ions using a ultrafiltration/polychelant system.

The apparatus diagram is shown in FIG. 4. The feed solution is stored in a pressurized reservoir and is fed to the cell under a pressure of 30 psig. The permeation cell is a "polysulfone ultrafiltration membrane" and is used as a 4.3 cm diameter disc in a Amicon 43 mm stirred ultrafiltration cell. The chelant is the polymer of Example 8(a). A volume of 25 ml of polymer solution is used in which the concentration of attached ethylenediaminetriacetic acid groups is about 0.01M. The permeate from the cell is collected on a fraction collector and samples are analyzed immediately for copper and nickel using colorimetric methods. At the end of the experiment, analyses are run for all metal ions using inductively coupled plasma (ICP) analysis. A pressure of 30 psig is maintained on the cell, which results in a flow rate of about 0.7 ml/min, equivalent to about 20 gal/ft² per day.

Figure 5:
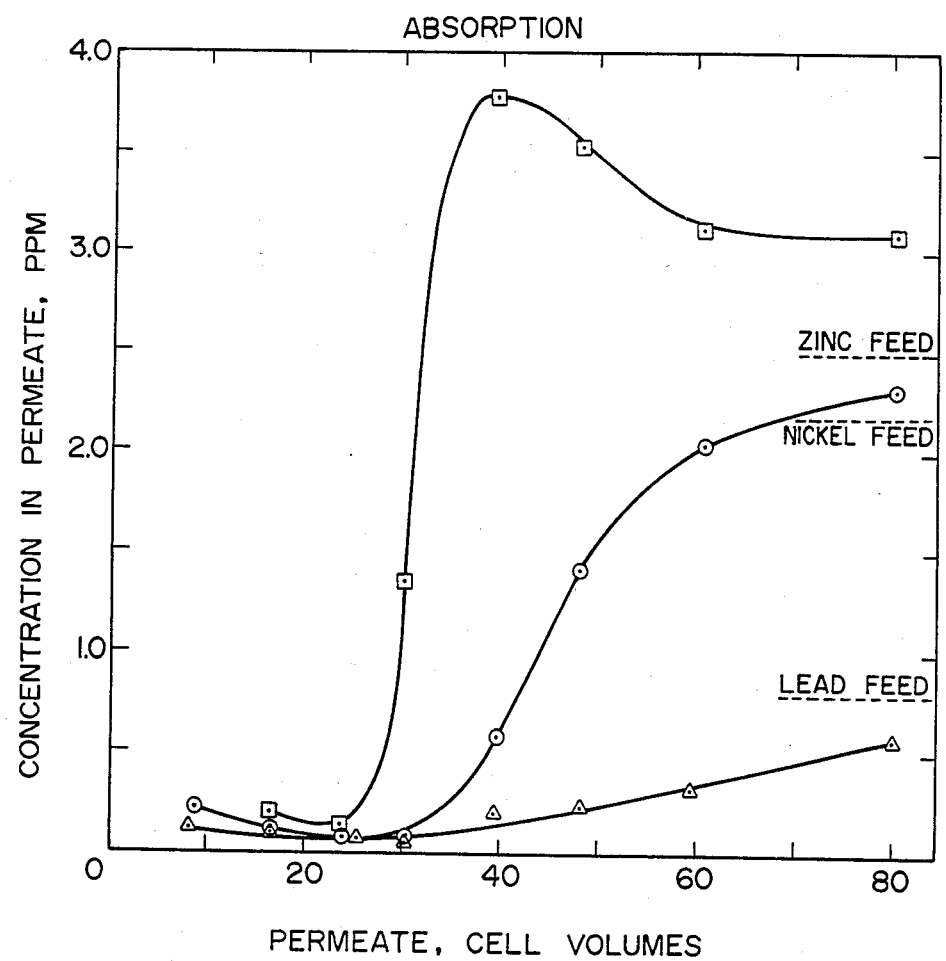
FIG. 5 shows the concentration of metal ions in the permeate.

The results of the separation of the metal ions are plotted in FIG. 5. Practically no metal ion content is observed in the first 25 cell volumes of permeate, showing that the metal ions were retained by the chelate. The zinc ion (boxes) showed first and peaked at about 40 cell volumes. The nickel ion (circles) next appeared, followed by the lead ion (triangles).

The experiment is actually continued to more than 200 cell volumes of permeate, although only copper ion is determined and less than 0.05 ppm of copper is found in all samples.

Figure 6:
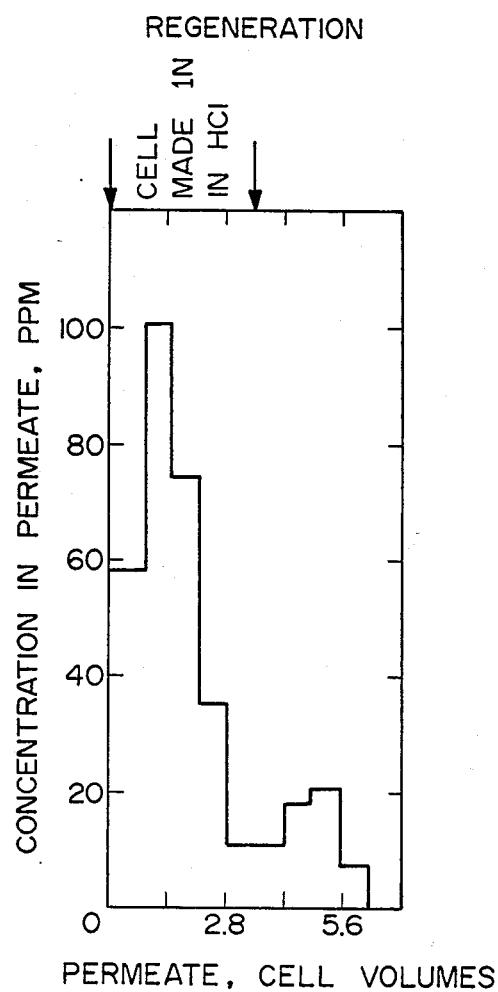
FIG. 6 shows the concentration of metal ions in the permeate after the addition of aqueous hydrochloric acid.

At this point, the aqueous feed is stopped, the cell solution is made about 1N in hydrochloric acid, and flushed with water. The elution curve of FIG. 6 is obtained. About three cell volumes of final metal concentrate are obtained. It is also possible to greatly reduce this amount by concentrating the separation cell contents prior to flushing with mineral acid and water.

A major operating parameter in ultrafiltration is the concentration of chelant polymer in the cell. Since the polymer is retained in the cell, there is a tendency for the polymer to concentrate in the vicinity of the membrane surface which leads to reduced flow rates. This build up is generally referred to as "polarization". The effect is minimized by rapid stirring in the cell or by fast recycling rates when hollow fiber membrane systems are used. The permeation rate of the liquid through the cell is also dependent upon actual polymer concentration. The relationship or flow rate to polymer concentration is shown in FIG. 7 for this ultrafiltration cell system and polymeric chelate. As can be seen in FIG. 7 the rate of permeation decreases as the concentration of the ED3A/FIBRABON 35 polymer increases.

While some embodiments of the invention have been shown and described herein, it will become apparent to those skilled in the art that various modification and changes can be made in the process to remove metals from fluid streams using water soluble polymeric organic chelants without departing from the spirit and scope of the present invention. All such modifications and changes coming within the scope of the appended claims are intended to be covered thereby.

We claim:

1. A cyclic process for the removal of metal ions selected from the group consisting of iron, cobalt, chromium, vanadium, copper, cadmium, nickel, zinc, lead, aluminum, mercury, silver, manganese from a fluid stream comprising said metal ions, which process comprises:

(A) contacting the fluid stream in a contacting zone with an aqueous reaction solution at between about 10° and 90° C. for a time sufficient to chelate the metal ions the reaction solution itself consisting essentially of an effective amount of water-soluble organic polymeric chelant to chelate the metal ion present selected from organic polymeric chelants of the formula:

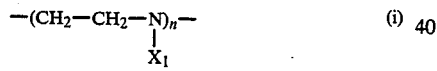

(i)

wherein $X_1$ in each unit of the polymer is a pendant group independently selected from —H or a substituent selected from —CH$_2$COOH, —CH$_2$—P(=O)(OH)$_2$,

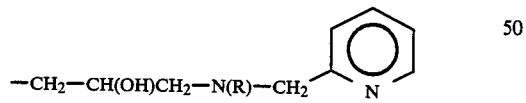

wherein R is alkyl, aminoalkyl, hydroxyalkyl, sulfoalkyl, or carboxyalkyl, and alkyl in these substituents contains from one to four carbon atoms; or

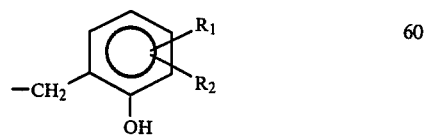

wherein $R_1$ and $R_2$ are each independently —CH$_3$, —SO$_3$H, —Cl, —H, or —COOH; and n is an integer between about 5 and 20,000;

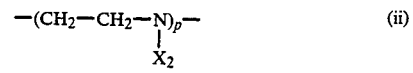

(ii)

wherein p is an integer between about 5 and 20,000; and wherein $X_2$ in each polymer unit is each independently selected from H— or a substituent selected from:

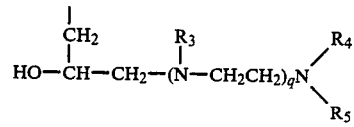

wherein $R_3$, $R_4$, and $R_5$ are each independently selected from —H, —CH$_2$COOH, or —CH$_2$P(=O)(OH)$_2$ and q is 0, 1, 2, 3, or 4;

(iii)

wherein r is an integer between about 10 and 20,000 and $X_3$ in each polymer unit is independently selected from H— or a substituent selected from:

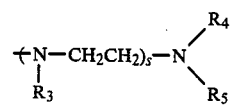

wherein $R_3$, $R_4$, and $R_5$ are as defined hereinabove, and s is an integer between about 1 and 4; or

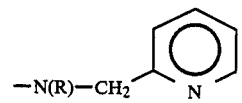

wherein R is as defined hereinabove;

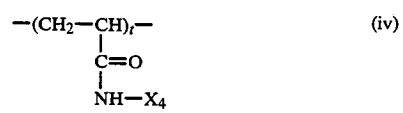

(iv)

wherein t is an integer between about 10 and 20,000; and $X_4$ in each polymer unit is independently selected from H— or a substituent selected from:

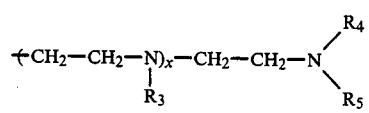

wherein x is an integer between 1 and 4; and $R_3$, $R_4$ and $R_5$ are as defined hereinabove; or

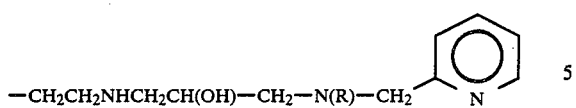

wherein R is as defined hereinabove;

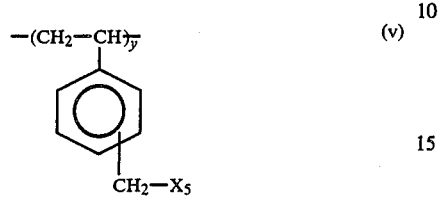

wherein y is an integer between about 10 and 20,000; and $X_5$ in each polymer unit is independently selected from —H or a substituent selected from:

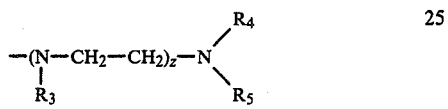

wherein z is an integer between about 1 and 4; and $R_3$, $R_4$ and $R_5$ are as defined hereinabove; or

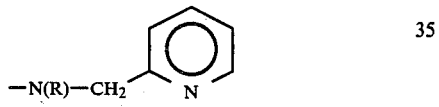

wherein R is as defined hereinabove;

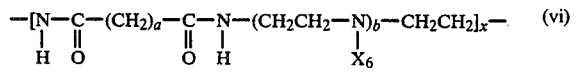

wherein a is 6 and b is 1 to 4, and $X_6$ in each polymeric unit is independently selected from —H or a substituent selected from:

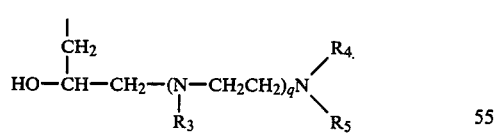

wherein q is 1 to 4, and $R_3$, $R_4$ and $R_5$ are as defined hereinabove; or

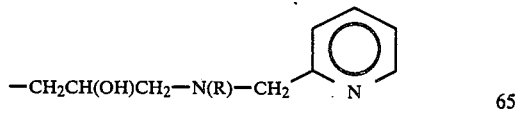

wherein R is as defined hereinabove; and x is between about 10 and 10,000;

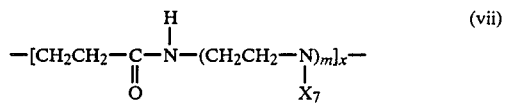

wherein $X_7$ in each polymeric unit is independently selected from —H or a substituent;

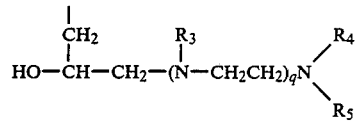

wherein q and $R_3$, $R_4$ and $R_5$ are defined hereinabove; or

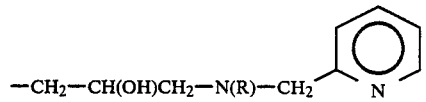

wherein R is as defined hereinabove; and m is an integer from 1 to 4 and x is as defined hereinabove;

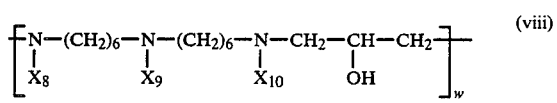

wherein $X_8$, $X_9$, and $X_{10}$ are each independently selected from —H or a substituent selected from:

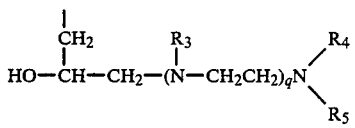

wherein q, $R_3$, $R_4$ and $R_5$ are as defined hereinabove, or

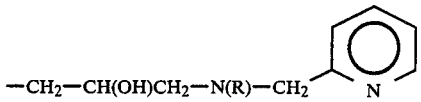

wherein R is as defined hereinabove; and w is between about 10 and 10,000;

with the proviso that the overall ratio of H to substituent in $X_1$, H to substituent in $X_2$, H to substituent in $X_3$, H to substituent in $X_4$, H to substituent in $X_5$, H to substituent in $X_6$, H to substituent in $X_7$, —CH$_2$CH(OH)CH$_2$OH or —CH$_2$CH(OH)CH$_2$Cl to substituent in each of $X_8$, $X_9$, or $X_{10}$ in each organic polymeric chelant described hereinabove is between about 10/90 and 90/10 and wherein the polymeric chelant has a molecular weight of between about 600 and 1,000,000;

(B) treating the aqueous solution produced in step (A) by membrane separation means effective to remove water and other low molecular weight reaction products having a molecular weight of 500 or less from the aqueous solution as a single phase;

(C) contacting the concentrated aqueous solution produced in step (B) with a mineral acid under conditions effective to release the metal ion from the chelant and form a regenerated chelant; and (D) removing the released metal ion by a second membrane separation means effective to separate the released metal ion as a single phase from said regenerated chelant; and (E) recycling the concentrated aqueous solution including said regenerated chelant from step (D) to the contacting zone of step (A).

2. The cyclic process of claim 1 wherein the membrane separation means in step (A) or in step (D) is ultrafiltration.

3. The cyclic process of claim 1 wherein the polymeric chelant is formula (i).

4. The cyclic process of claim 1 wherein the polymeric chelant is formula (ii).

5. The cyclic process of claim 1 wherein the polymeric chelant is formula (iii).

6. The cyclic process of claim 1 wherein the polymeric chelant is formula (iv).

7. The cyclic process of claim 1 wherein the polymeric chelant is formula (v).

8. The cyclic process of claim 1 wherein the polymeric chelant is formula (vi).

9. The cyclic process of claim 1 wherein the polymeric chelant is formula (vii).

10. The cyclic process of claim 1 wherein the polymeric chelant is formula (viii).

11. A process for the removal of metal ions selected from the group consisting of iron, cobalt, chromium, vanadium, copper, cadmium, nickel, zinc, lead, aluminum, mercury, silver, manganese from a fluid stream comprising said metal ions, which process comprises:

(A) contacting the fluid stream in a contacting zone with an aqueous reaction solution at between about 10° and 90° C. for a time sufficient to chelate the metal ions the reaction solution itself comprising an effective amount of water-soluble organic polymeric chelant selected from organic polymeric chelants of the formula:

$$-(CH_2-CH_2-N)_n- \quad \text{(i)}$$
$$\qquad\quad\; |$$
$$\qquad\quad\; X_1$$

wherein $X_1$ in each unit of the polymer is a pendant group independently selected from —H or a substituent selected from

—CH$_2$COOH, —CH$_2$—P(=O)(OH)$_2$,

wherein R is alkyl, aminoalkyl, hydroxyalkyl, sulfoalkyl, or carboxyalkyl, and alkyl in these substituents contains from one to four carbon atoms; or

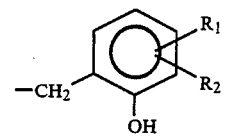

wherein $R_1$ and $R_2$ are each independently —CH$_3$, —SO$_3$H, —Cl, —H, or —COOH; and n is an integer between about 5 and 20,000;

$$-(CH_2-CH_2-N)_p- \quad \text{(ii)}$$
$$\qquad\quad\; |$$
$$\qquad\quad\; X_2$$

wherein p is an integer between about 5 and 20,000; and wherein $X_2$ in each polymer unit is each independently selected from H— or a substituent selected from:

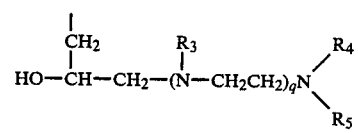

wherein $R_3$, $R_4$, and $R_5$ are each independently selected from —H, —CH$_2$COOH, or —CH$_2$P(=O)(OH)$_2$ and q is 0, 1, 2, 3, or 4;

$$-(CH_2-CH-O)_r- \quad \text{(iii)}$$
$$\qquad\quad |$$
$$\qquad\;\; CH_2X_3$$

wherein r is an integer between about 10 and 20,000 and $X_3$ in each polymer unit is independently selected from H— or a substituent selected from:

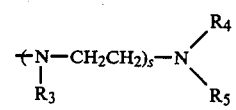

wherein $R_3$, $R_4$, and $R_5$ are as defined hereinabove, and s is an integer between about 1 and 4; or

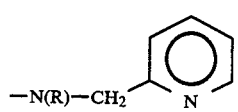

wherein R is as defined hereinabove;

$$-(CH_2-CH)_t- \quad \text{(iv)}$$
$$\qquad\;\; |$$
$$\qquad\;\; C=O$$
$$\qquad\;\; |$$
$$\qquad\;\; NH-X_4$$

wherein t is an integer between about 10 and 20,000; and $X_4$ in each polymer unit is independently selected from H— or a substituent selected from:

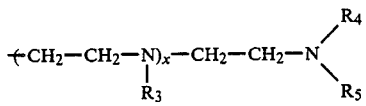

wherein x is an integer between 1 and 4; and $R_3$, $R_4$ and $R_5$ are as defined hereinabove; or

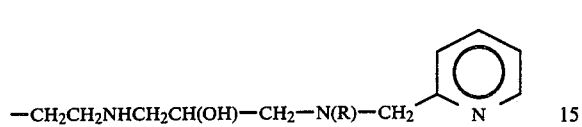

wherein R is as defined hereinabove;

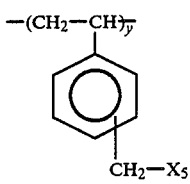   (v)

wherein y is an integer between about 10 and 20,000; and $X_5$ in each polymer unit is independently selected from —H or a substituent selected from:

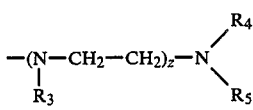

wherein z is an integer between about 1 and 4; and $R_3$, $R_4$ and $R_5$ are as defined hereinabove; or

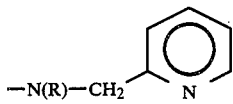

wherein R is as defined hereinabove;

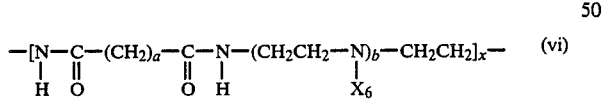   (vi)

wherein a is 6 and b is 1 to 4, and $X_6$ in each polymeric unit is independently selected from —H or a substituent selected from:

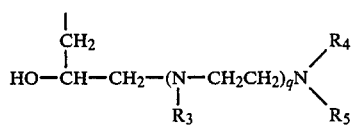

wherein q is 1 to 4, and $R_3$, $R_4$ and $R_5$ are as defined hereinabove; or

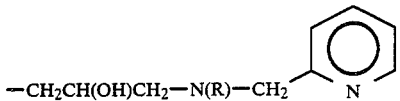

wherein R is as defined hereinabove; and x is between about 10 and 10,000;

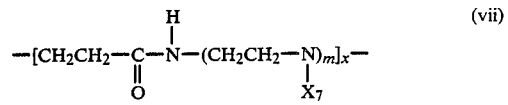   (vii)

wherein $X_7$ in each polymeric unit is independently selected from —H or a substituent;

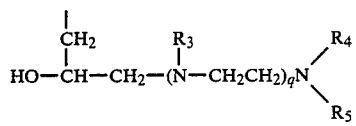

wherein q and $R_3$, $R_4$ and $R_5$ are defined hereinabove; or

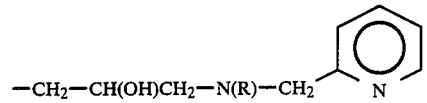

wherein R is as defined hereinabove; and m is an integer from 1 to 4 and x is as defined hereinabove;

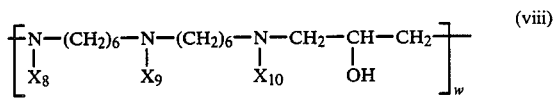   (viii)

wherein $X_8$, $X_9$, and $X_{10}$ are each independently selected from —H or a substituent selected from:

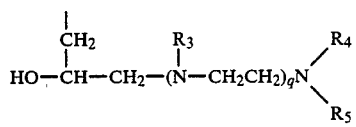

wherein q, $R_3$, $R_4$ and $R_5$ are as defined hereinabove, or

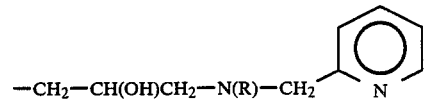

wherein R is as defined hereinabove; and w is between about 10 and 10,000;

with the proviso that the overall ratio of H to substituent in $X_1$, H to substituent in $X_2$, H to substituent in $X_3$, H to substituent in $X_4$, H to substituent in $X_5$, H to substituent in $X_6$, H to substituent in $X_7$, —$CH_2CH(OH)CH_2OH$ or —$CH_2CH(OH)CH_2Cl$ to substituent in each of $X_8$, $X_9$, or $X_{10}$ in each organic polymeric chelant described hereinabove is between about 10/90 and 90/10, and wherein the polymeric chelant has a molecular weight of between about 600 and 1,000,000;

(B) treating the aqueous solution produced in step (A) by membrane separation means effective to remove water and other low molecular weight reaction products having a molecular weight of 500 or less from the aqueous solution in a single phase;

(C) contacting the concentrated aqueous solution produced in step (B) with a mineral acid under conditions effective to release the metal ion from the chelant and form a regenerated chelant; and (D) removing the released metal ion by a second membrane means effective to separate the release metal ion as a single phase from said regenerated chelant; and (E) recycling the concentrated aqueous solution including said regenerated chelant from step (D) to the contacting zone of step (A).

12. The cyclic process of claim 11 wherein in step (B) the aqueous solution is concentrated by means selected from ultrafiltration and dialysis.

13. The cyclic process of claim 12 wherein the means is ultrafiltration.

14. The cyclic process of claim 11 wherein the substituent in $X_2$, $X_3$, $X_4$, $X_5$, $X_6$, $X_7$, $X_8$, $X_9$ or $X_{10}$ comprises a pyridine group.

15. The cyclic process of claim 14 wherein the R group is alkyl.

16. The cyclic process of claim 15 wherein the alkyl is methyl.

17. The cyclic process of claim 16 wherein the metals removed are copper and iron.

18. The cyclic process of claim 14 wherein the metal ions removed are copper, iron, zinc, lead, nickel or mixtures thereof.

* * * * *